Oct. 14, 1924.
M. E. ROGNESS
1,511,909
PISTON REPAIRING MACHINE
Filed June 5, 1922
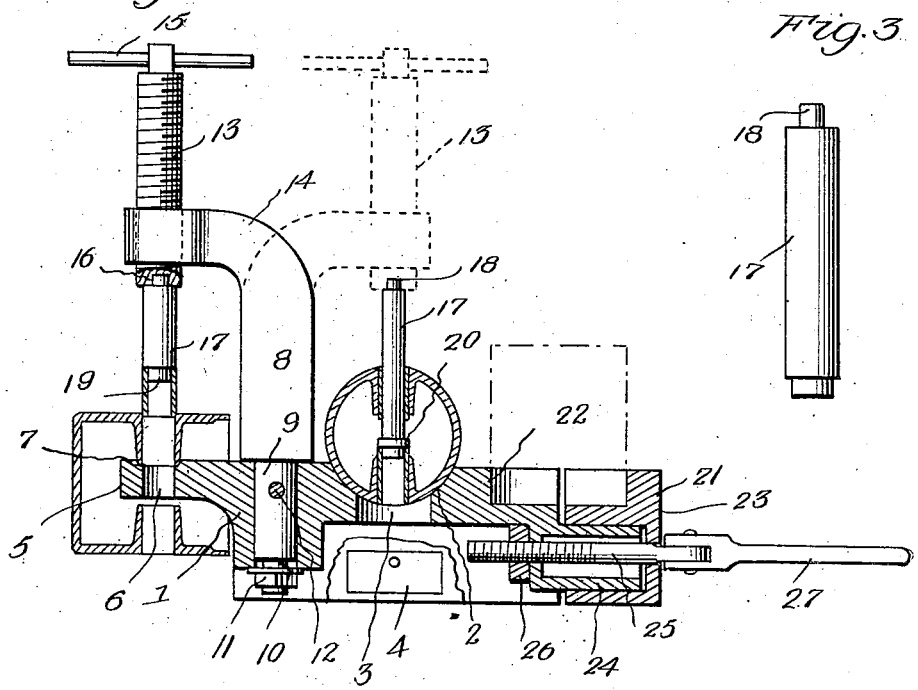
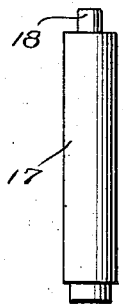
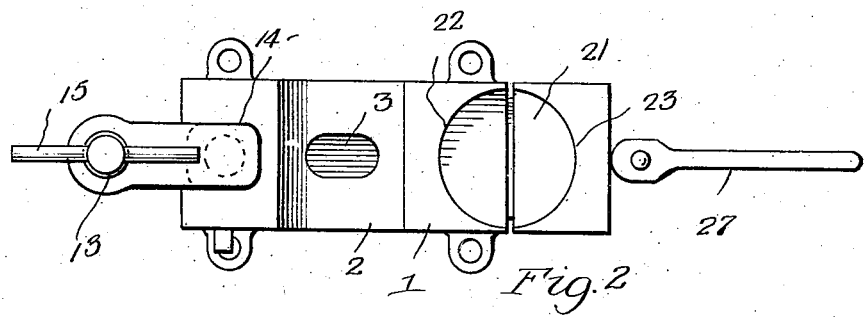
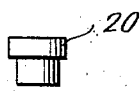
INVENTOR.
M. E. ROGNESS
BY Victor J. Evans
ATTORNEY.

Patented Oct. 14, 1924.

1,511,909

UNITED STATES PATENT OFFICE.

MARTIN E. ROGNESS, OF ORTLEY, SOUTH DAKOTA.

PISTON-REPAIRING MACHINE.

Application filed June 5, 1922. Serial No. 565,847.

*To all whom it may concern:*

Be it known that I, MARTIN E. ROGNESS, a citizen of the United States, residing at Ortley, in the county of Roberts and State of South Dakota, have invented new and useful Improvements in Piston-Repairing Machines, of which the following is a specification.

This invention relates to a machine for operation on pistons and has for its primary object the construction of a machine that will more readily remove and replace bushings.

An object of the invention is to combine in a single machine parts for removing bushings, replacing same or clamping a piston in position to be readily acted upon for replacing piston rings or similar operations.

Another object of the invention is to provide means for more effective removing and replacing bushings thereby preventing marring, or replacing of parts.

A feature of the invention is the novel manner of mounting the standard so that the power exerting device may be thrown to either of two positions for performing either operation.

With these and other objects in view the invention will be better understood from the following detailed description and taken in connection with the accompanying drawing wherein:

Fig. 1 is a sectional view of my improved machine.

Fig. 2 is a top plan view.

Fig. 3 is a detail view of one of the tools.

Fig. 4 is a side elevation of the cap.

Again referring to the drawing illustrating one of the many constructions of my invention the numeral 1 designates a table of any suitable construction having a piston receiving seat 2 that connects with a passage 3 directly over the drawer 4 so that as the bushings are removed they will be deposited in the drawer from which they may be readily removed. The table is provided with an extension 5 having a hole 6 that is partly countersunk as indicated at 7 so that the bearing of the piston will fit snugly therein and assure the aligning of the bearing hole with the hole 6 so that the bushing may be readily and accurately inserted. A standard 8 is provided with a stub shaft 9 rotatably supported by the table and provided with a threaded shank 10 upon which is mounted a nut 11 that clamps against the table. A pin 12 is passed through the table and the shaft to assure accurate positioning of the standard in either of its two positions. A feed screw 13 is mounted in the arm 14 projecting from the standard. The upper end of the feed screw is connected to the handle 15 while the lower end is provided with a socket 16 that is adapted to have interchangeable connection with my improved tools. Each tool is in the form of a cylindrical bar 17 having a reduced cylindrical lug 18 for interchangeable connection with the socket 16. In Figure 1 it will be noted that the bar 17 used for inserting the bushing has cylindrical extension 19 fitting within the bushing. The bar 17 used to remove the bushings is provided with a lug 18 heretofore described but the lower end is arranged upon the bushing. It will be noted that this tool operates in a manner to assure proper movement of the tool in removing a bushing as same is properly guided through the bearing.

For the purpose of providing a combined machine I provide a vise structure 21 consisting of a stationary jaw 22 and movable jaw 23 sliding on the extension 24 of the table. A feed screw 25 has engagement with the nut 26 mounted behind the extension and a handle 27 is provided for turning the screw.

From the foregoing description it will be seen that I provide a machine that may perform three or more functions in working upon pistons. It will also be noted that the operation is such that the bushings may be accurately removed and replaced thereby preventing mutilation of the parts.

It is, of course, to be understood that the invention may be constructed in various other manners and the parts associated in different relations and, therefore, I do not desire to be limited in any manner except as set forth in the claims hereunto appended.

Having thus described my invention what I claim is:

1. A piston repair machine comprising a table having a piston seat and a passage communicating therewith, a drawer supported by the table directly under the passage, an extension on the table having a hole partly countersunk, a standard rotatably supported by the table, a feed screw mounted in the standard, and tools interchangeably connected to the feed screw for either forcing the bushings one at a time from the piston through the passage or to insert bushings into the piston when supported by the extension.

2. A piston repair machine comprising a table having a piston seat and a passage in communication therewith, a drawer supported by the table directly under the passage, an extension on the table having a hole partly countersunk, a standard rotatably supported by the table, a feed screw mounted in the standard, and tools interchangeably connected to the feed screw for either forcing the bushings one at a time from the piston through the passage or to insert bushings into the piston when supported by the extension, said standard having a stub shaft rotatably mounted in the table and elements for locking the shaft in a predetermined position.

3. A piston repairing machine comprising a table constructed to support a piston at spaced positions, a standard swingingly mounted on the table to be swung to operative position according to the particular position of the piston, bushing operating means carried by said standard.

In testimony whereof I affix my signature.

MARTIN E. ROGNESS.